United States Patent [19]

Hill

[11] Patent Number: 4,625,679

[45] Date of Patent: Dec. 2, 1986

[54] BEDDING PRODUCT FOR ANIMALS AND METHOD OF MAKING SAME

[76] Inventor: Robert V. Hill, 2902 Park St., Middleton, Wis. 53562

[21] Appl. No.: 640,524

[22] Filed: Aug. 14, 1984

[51] Int. Cl.[4] ............................................ A01K 1/015
[52] U.S. Cl. ........................................................ 119/1
[58] Field of Search ............................................ 119/1

[56] References Cited

U.S. PATENT DOCUMENTS

| | | | |
|---|---|---|---|
| 3,286,691 | 11/1966 | McFadder | 119/1 |
| 3,828,731 | 8/1974 | White | 119/1 |
| 4,203,388 | 5/1980 | Cortigene et al. | 119/1 |
| 4,263,873 | 4/1981 | Christianson | 119/1 |
| 4,311,115 | 1/1982 | Litzinger | 119/1 |
| 4,378,756 | 4/1983 | Whiteman | 119/1 |

*Primary Examiner*—Hugh R. Chamblee
*Attorney, Agent, or Firm*—Peterson, Wicks Nemer & Kamrath

[57] ABSTRACT

Cellulose pellets, preferably of paper, are partially torn apart so as to produce a particulate bedding product for animals, the product having a substantially decreased density and a substantially increased surface area.

17 Claims, 1 Drawing Figure

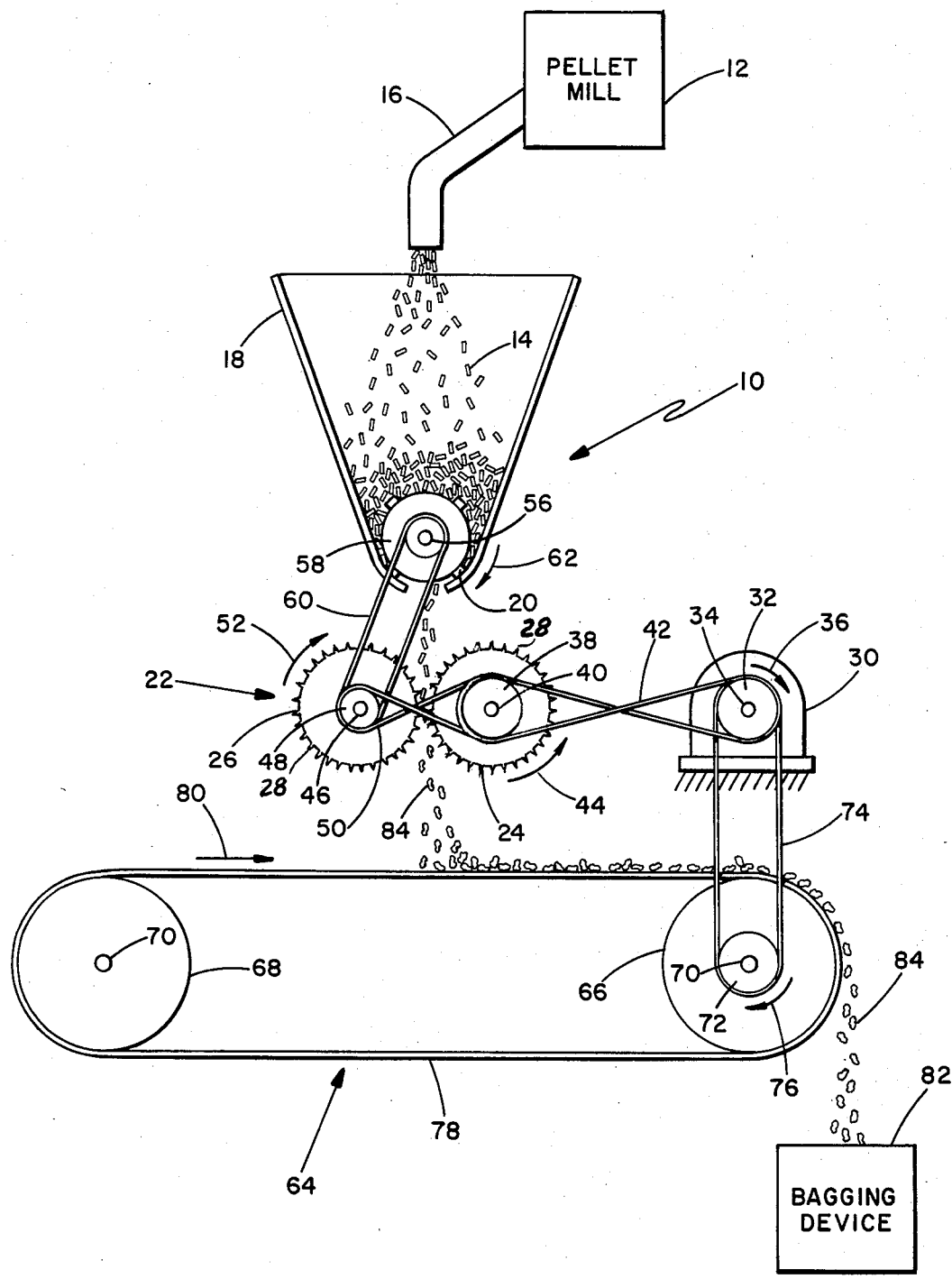

BEDDING PRODUCT FOR ANIMALS AND METHOD OF MAKING SAME

BACKGROUND OF THE INVENTION

1. Field of the Invention

This invention relates generally to bedding for animals, as well as the method for making such bedding, and pertains more particularly to a low-density paper product.

2. Description of the Prior Art

The patent literature is replete with various litter and bedding products. Most of the products with which I am acquainted have a relatively high density, and a number of the products additionally include sizable quantities of sand or clay.

Actually, the closest patent that I know of is U.S. Pat. No. 4,263,873 granted on Apr. 28, 1981 to George Christianson for "ANIMAL LITTER AND METHOD OF PREPARATION." While the pelletized paper product described in said patent has performed admirably, the pellets possess a higher density than need be and therefore provide a decreased amount of surface area for the weight of a given number of such pellets.

SUMMARY OF THE INVENTION

A general object of my invention is to provide a low cost and lower density bedding product for household pets and laboratory animals. In this regard, an aim of the invention is to convert compacted cellulose pellets, preferably paper pellets, into loose, fluffy particles having relatively large surface areas and increased absorption characteristics.

Inasmuch as my invention has especial utility as a bedding for various types of pets, such as rabbits, guinea pigs, gerbils, hamsters and birds, as well as laboratory rodents, it is important to have the bedding quite soft. My invention effectively and inexpensively achieves this quality.

Another object is to provide a bedding material that will not require as frequent changes as in the past. While this is a desirable attribute in household situations, it is an even more important quality when used in laboratories, such as those associated with universities and colleges, for appreciable savings in paid labor can be achieved when utilizing the teachings of my invention.

Yet another object of the invention is to reduce urine, excrement and body odors that other types of bedding and litter have been known to pick up. Wood shavings, particularly pine, are known to pick up and retain odors, thereby requiring virtually daily changes. As mentioned above, labor costs are important as far as operating any animal laboratory, and also the cost of obtaining the shavings has an important economical consideration. For instance, wood shavings can cost seven or eight times the amount that my material costs. Hence, an aim of my invention is to provide a very cost effective material that possesses a number of advantages in addition to the price differential for other products.

Still further, an object of the invention is to provide a bedding product that can be disposed of conveniently. In this regard, the bedding product made in accordance with my invention is completely biodegradable and readily flushed down conventional toilets, or thrown away with ordinary garbage, or mixed with garden soil.

Briefly, my invention envisages the making of cellulose pellets, preferably paper pellets in general accordance with the procedure described in U.S. Pat. No. 4,263,873, supra. Although such paper pellets are relatively lightweight, especially when compared to other bedding and litter products, they are heavier than need be. Therefore, my invention takes the pellets in the form that they appear when made in accordance with U.S. Pat. No. 4,263,873 and further processes the pellets by partially tearing them apart, that is, rupturing them to such a degree that they become quite fluffed and concomitantly possess an appreciably reduced density. In this regard, my invention permits the achieving of a bedding product having approximately 50 to 60 percent of the density that the paper pellets possess, at the same time presenting a considerably increased surface area as well as a degree of softness that makes the product particularly appealing to various types of small animals.

BRIEF DESCRIPTION OF THE DRAWING

The single FIGURE is a diagrammatic view of apparatus exemplifying my invention which depicts pellets being fed downwardly between two sawtooth rollers and the fluffed product resulting from the difference in roller speeds.

DESCRIPTION OF THE PREFERRED EMBODIMENT

The apparatus illustrating my invention has been denoted generally by the reference numeral 10 in the drawing. The apparatus includes a pellet mill 12, such as that generally referred to in said U.S. Pat. No. 4,263,873. While the cellulose fed to the pellet mill 12 can assume various forms, it is imperative that it have as little clay content as possible. Newsprint, for instance, is suitable. It is from the pellet mill 12 that the pellets, which have been given the reference numeral 14, are forwarded through a chute 16 to a hopper 18 having journaled therein a rotor agitator 20 and a feed control slide (not shown); the control slide sets the rate at which the pellets 14 are discharged downwardly to a roller mill indicated generally by the reference numeral 22.

It is not necessary to describe completely the roller mill 22. However, it can be pointed out that a roller mill 22 found suitable in actual production is manufactured by Roskamp Mfg., Inc. of Cedar Falls, Iowa. The roller mill 22, which is only diagrammatically depicted, includes two corrugated rolls 24, 26, each having a number of sawteeth 28 thereon. More specifically, the roll size is nine inches in diameter and there are 3½ grooves (or teeth 28) per inch of circumference (1.4 grooves/cm). While it is possible to utilize rolls 24, 26 of different diameters, it is planned that the rolls 24, 26 be of equal diameters (nine inches or 23 centimeters) but rotated at different speeds. In this regard, the roller 26 is rotated at 655 rpm and the roller 24 is rotated at 425 rpm.

It is important, when practicing my invention, to utilize different circumferential speeds. More specifically, it will be appreciated that the roller 26 provides a speed approximating 25.7 feet/second (7.8 meters/second) and the roller 24 provides a surface speed of approximately 16.6 feet/second (5.0 meters/second). Hence, the ratio of roller surface speeds should be on the order of 1.5:1; in other words, the surface speed of the roller 26 is 1.5 times faster than that of the other roller 24.

The rollers 24, 26 are driven by an electric motor 30 having a pair of side-by-side drive pulleys 32, both being keyed to the motor's shaft labeled 34 which rotates in a clockwise direction as indicated by the arrow 36. The roll 24 has a pair of side-by-side pulleys 38, both being keyed to a shaft 40. By means of a twisted belt 42 entrained about the pulleys 32 and 38, the roll 24 is caused to rotate in a counterclockwise direction as denoted by the arrow 44. Whereas the roller 24 is mounted on the shaft 40, the slower roller 26 is mounted on a shaft 46 having a pair of side-by-side pulleys 48 keyed thereto. Through the agency of a belt 50 entrained about the other pulley 38 and one of the pulleys 48, the roll 26 is driven in a clockwise direction as indicated by the arrow 52. It will be understood that the slower rotative speed, in the schematically presented drawing, is derived by reason of the pulleys 48 being of a larger diameter than the pulleys 38. In actual practice, though, gears would be used to obtain the speed reduction, the belts 42 and 50, together with the pulleys 38 and 48, having been pictured in order to simplify the drawing as much as possible.

The agitator 20 is provided with a shaft 56 that has a pulley 58 keyed thereto. By means of a belt 60 entrained about the other of the previously mentioned pulleys 48 and the pulley 58, the agitator 20 is rotated in a clockwise direction as denoted by the arrow 62.

Largely for the sake of completion, the apparatus 10 further includes a conveyor indicated generally by the reference numeral 64, the conveyor being located beneath the roller mill 22 as clearly evident in the drawing. The conveyor 64 includes a pair of spaced drums 66 and 68, each being mounted for rotation on a shaft 70. The shaft 70 for the drum 66 has a pulley 72 keyed thereon. A belt 74 is entrained about the other pulley 32 on the motor shaft 34 and the pulley 72 that has just been alluded to so that the drum 66 rotates in a clockwise direction as signified by the arrow 76. The conveyor 64 further includes an endless belt 78 passing about both of the rollers 66 and 68. In this way, the upper flight of the belt 78 travels in a direction shown by the arrow 80, that is from left to right as viewed in the drawing.

Still further, the apparatus 10 includes a bagging device indicated in block form by the reference numeral 82.

Whereas the pellets 14 coming from the pellet mill 12 are somewhat compact, they are literally torn apart, or at least partially so, and the resulting ruptured product is in the form of a conglomerate of fluffed cellulose particles 84. Actually, the fluffed particles 84 emanating from the roller mill 22, when derived from paper, have a density approximating only fifty to sixty percent of the density of the paper pellets 14. While the density is decreased substantially, the surface area of the resulting particulate material 84 is even more pronounced. For example, one batch of pellets 14 weighed 282 grams per liter, whereas the resulting fluffed product 84 weighed 178 grams per liter. Typically, a range of 250 to 500 grams per liter for the pellets 14 has been experienced in a number of investigations. Similarly, the fluffed product 84 has shown a range of from 150 to 250 grams per liter. Quite obviously, the foregoing has resulted in a packaged density of 0.282 grams per cubic centimeter and a range of 0.25 to 0.50 gram per cubic centimeter as far as the pellets 14 are concerned. By the same token, the above data results in a packaged density of 0.178 gram per cubic centimeter and a range of 0.15 to 0.25 gram per cubic centimeter for the fluffed material 84.

It might be helpful to consider the initial density of a typical individual paper pellet 14. In this regard, the density has been on the order of 1.0 gram per centimeter, and the density generally within the range of 0.5 and 1.3 grams/cubic centimeter. Usually, however, the density has been on the lower side—namely, on the order of 0.5 or 0.6 gram/cubic centimeter.

Additionally, it is preferred that the pellets 14 have an appropriate size. In this regard, a diameter of 0.5 centimeter (a cross section of about 0.2 square centimeter) and a length of 1.25 centimeters have been found suitable, although diameters of approximately 0.16 to 0.80 centimeter and lengths of slightly more than 0.5 centimeter are satisfactory.

After passing through the roller mill 22, the conglomerate of cellulose particles 84, when made from paper, will have a packaged density on the order of 0.178 gram/cubic centimeter. However, a range of packaged densities between 0.15 and 0.30 gram/cubic centimeter is realized in actual practice. Reducing the packaged density via my rupturing process to just one half the packaged pellet density, produces superb absorbtion results, it can be pointed out. It should be recognized that the resulting density of the fluffed cellulose material 84 is dependent upon the density of the pellets 14; in other words, if the density of the cellulose pellets is high, then the density of the loose, fluffed material will be proportionally high. However, by keeping the density of the pellets 14 low, the density of the particles 84 is correspondingly about fifty percent lower, and at the same time providing an increased surface area on the order of ten times that of the original pellets 14. Owing to the tearing or rupturing action caused by the differential rotation rates of the rolls 24 and 26, (and their sawteeth 28), the resulting product is composed of particles 84 having irregular dimensions that are randomly greater and less than the size of the pellets 14 from which they were derived.

As with the paper pellets described in the Christianson patent, hereinbefore identified, it is intended that an acid salt be incorporated into the bedding product 84 for neutralizing urine and other odors. This is done when initially pelletizing the paper. Examples of various effective acid salts are listed in the Christiansen patent.

It can be explained that the water content is important when making the paper pellets 14. Preferably, the moisture content of the pellets 14 is in the range of 10–25 percent, a moisture content of 15 or 16 percent being preferable. A high moisture content has in the past interfered with the shelf life of the pellets. On the other hand, a sufficient moisture level is required in order to pelletize the paper material. As far as my invention is concerned, however, it is only necessary to provide a cellulose pellet 14 that will for all intents and purposes remain intact until partially torn apart in the roller mill 22. The shelf life of the fluffed product 84 can be prolonged, if found desirable to do so, by subjecting the particles to a drying step. Atmospheric drying alone can remove enough moisture, if found desirable and necessary so as to increase the shelf life. Not only does reducing the moisture content to a desired low level enhance the longevity of the particles 84 when stored, but this also increases their absorptive capabilities. Thus, the material 84 can be drier than when in pellet form, and the absorptive properties thereof are greatly increased by reason of the vastly increased surface area. In this regard, the end product 84 is quite cellular by virtue of the rupturing procedure employed when using my invention, and the increase in the number of open cells present in the bedding product 84 enables a considerable amount of urine to be soaked up in contradistinction to the lesser capability inherent in the more compacted pellets 14. Various tests employing 50 grams of paper pellets 14 and 50 grams of the fluffed product 84, using 200 grams of tap water, have shown a vast improvement in absorbtion between the pelletized form and the expanded form—the fluffing material 84 aborbing over 50 percent more water than the pellets 14.

I claim:

1. A method of making an animal bedding product comprising the step of partially rupturing or tearing apart cellulose pellets to provide fluffed particles having a lesser density than said pellets.

2. A method of making an animal bedding product in accordance with claim 1 in which said cellulose pellets are paper pellets.

3. A method of making an animal bedding product in accordance with claim 2 in which said paper pellets are of a package density of from 0.25 gram per cubic centimeter to 0.50 gram per cubic centimeter, and said resulting particles have a packaged density from 0.15 gram per cubic centimeter to 0.25 gram per cubic centimeter.

4. A method of making an animal bedding product in accordance with claim 1 in which said pellets have a density on the order of 0.282 gram per cubic centimeter and said particles have a density on the order of 0.178 gram per cubic centimeter.

5. A method of making an animal bedding product in accordance with claim 3 in which said pellets have a cross section of about 2.0 square centimeters and a length of about 1.25 centimeters, and said particles have dimensions that are randomly both greater and less than said pellet length.

6. A method of making an animal bedding product in accordance with claim 4 in which said pellets have a width on the order of 0.5 centimeter and a length on the order of 1.25 centimeters, and said particles have dimensions that are randomly both greater and less than said pellet dimensions.

7. An animal bedding product comprised of moisture-absorbing paper having a packaged density between 0.15 and 0.25 gram per cubic centimeter.

8. An animal bedding product in accordance with claim 7 in which the packaged density of said product is on the order of 0.178 gram per cubic centimeter.

9. An animal bedding product in accordance with claim 8 in which said paper is in the form of fluffed particles.

10. An animal bedding product in accordance with claim 9 in which said fluffed particles are derived from previously prepared paper pellets.

11. An animal bedding product in accordance with claim 10 in which said pellets have a diameter of approximately 0.5 centimeter and a length of approximately 1.25 centimeters.

12. An animal bedding product in accordance with claim 10 in which the diameter of said pellets is approximately 0.16 to 0.80 centimeter and the length of said pellets is slightly more than 0.5 centimeter.

13. An animal bedding product in accordance with claim 12 in which the packaged density of said pellets is approximately 0.282 gram per cubic centimeter.

14. A method of making an animal bedding product comprising the steps of introducing cellulose pellets between first and second corrugated rolls, each of said rolls having a number of circumferentially spaced sawteeth, and rotating said rolls in opposite directions at different surface speeds to cause said sawteeth to partially rupture or tear apart said cellulose pellets to provide fluffed particles having a lesser density than said pellets.

15. A method of making an animal bedding product in accordance with claim 14 in which the surface speed of said second roller is on the order of 1.5 times that of said first roller.

16. A method of making an animal bedding product in acordanace with claim 14 in which said cellulose pellets are paper pellets.

17. A method of making an animal bedding product in accordance with claim 16 in which said paper pellets are of a packaged density of from 0.25 gram per cubic centimeter to 0.50 gram per cubic centimeter, and said resulting particles have a packaged density from 0.15 gram per cubic centimeter to 0.25 gram per cubic centimeter.

* * * * *